United States Patent

Wilkinson et al.

[11] Patent Number: 6,096,448
[45] Date of Patent: Aug. 1, 2000

[54] METHOD AND APPARATUS FOR OPERATING AN ELECTROCHEMICAL FUEL CELL WITH PERIODIC FUEL STARVATION AT THE ANODE

[75] Inventors: David P. Wilkinson, North Vancouver; Clarence Y. F. Chow, Vancouver; Derek E. Allan, deceased, late of N. Vancouver; by Patricia Joanne Allan, administrator, Vanderhoof; Erik P. Johannes; Joy A. Roberts, both of Burnaby; Jean St-Pierre, Vancouver; Cindy J. Longley, Vancouver; John K. K. Chan, Vancouver, all of Canada

[73] Assignee: Ballard Power Systems Inc., Burnaby, Canada

[21] Appl. No.: 08/998,133

[22] Filed: Dec. 23, 1997

[51] Int. Cl.[7] .................................................. H01M 8/04
[52] U.S. Cl. ........................ 429/13; 429/22; 429/23
[58] Field of Search .................................. 429/13, 17, 19, 429/21, 22, 23, 12, 40

[56] References Cited

U.S. PATENT DOCUMENTS

| | | |
|---|---|---|
| 3,379,572 | 4/1968 | Gay . |
| 4,243,731 | 1/1981 | Cheron ........................................ 429/13 |
| 4,279,711 | 7/1981 | Vining et al. ........................ 204/105 R |
| 4,294,892 | 10/1981 | Alfenaar et al. ............................ 429/13 |
| 4,420,544 | 12/1983 | Lawson et al. ............................. 429/13 |
| 4,555,452 | 11/1985 | Kahara et al. .............................. 429/13 |
| 4,910,099 | 3/1990 | Gottesfeld .................................. 429/13 |
| 5,432,021 | 7/1995 | Wilkinson et al. ......................... 429/17 |
| 5,436,086 | 7/1995 | Seymour et al. ........................... 429/17 |
| 5,482,680 | 1/1996 | Wilkinson et al. ....................... 422/177 |
| 5,601,936 | 2/1997 | Dudfield et al. ........................... 429/13 |
| 5,677,073 | 10/1997 | Kawatsu .................................... 429/22 |

FOREIGN PATENT DOCUMENTS

| | | |
|---|---|---|
| 0692835 | 1/1996 | European Pat. Off. . |
| 0 710 996 A1 | 5/1996 | European Pat. Off. . |
| 0736921 | 10/1996 | European Pat. Off. . |
| 63-170865 | 7/1988 | Japan . |
| 2 290 409 | 12/1995 | United Kingdom . |

*Primary Examiner*—Maria Nuzzolillo
*Assistant Examiner*—Jonathan Crepeau
*Attorney, Agent, or Firm*—McAndrews, Held & Malloy, Ltd.

[57] ABSTRACT

A method and apparatus is provided for operating an electrochemical fuel cell with periodic momentary fuel starvation at the anode. It is believed that such momentary periodic fuel starvation conditions cause the anode potential to increase, resulting in the oxidation and removal of electrocatalyst poisons from the anode electrocatalyst and improved fuel cell performance. In a preferred method, while successive localized portions of the fuel cell anode are momentarily periodically fuel starved, the remainder of the fuel cell anode remains electrochemically active and saturated with fuel such that the fuel cell is continually available to generate power.

39 Claims, 9 Drawing Sheets

METHOD AND APPARATUS FOR OPERATING AN ELECTROCHEMICAL FUEL CELL WITH PERIODIC FUEL STARVATION AT THE ANODE

FIELD OF THE INVENTION

The present invention relates to a method and apparatus for operating an electrochemical fuel cell with periodic fuel starvation at the anode. More particularly, the method comprises periodically momentarily fuel starving at least a portion of the anode of an operational fuel cell. The method and apparatus may be used to improve fuel cell performance without suspending the generation of power by the fuel cell.

BACKGROUND OF THE INVENTION

Electrochemical fuel cells convert reactants, namely fuel and oxidant fluid streams, to produce electric power and reaction products. Solid polymer electrochemical fuel cells generally employ a membrane electrode assembly ("MEA") comprising a solid polymer electrolyte or ion-exchange membrane disposed between two porous electrically conductive electrode layers. The anode and cathode each comprise electrocatalyst, which is typically disposed at the membrane/electrode layer interface, to induce the desired electrochemical reaction.

At the anode, the fuel moves through the porous anode layer and is oxidized at the electrocatalyst to produce protons and electrons. The protons migrate through the ion exchange membrane towards the cathode. On the other side of the membrane, the oxidant moves through the porous cathode and reacts with the protons at the cathode electrocatalyst. The electrons travel from the anode to the cathode through an external circuit, producing an electrical current.

Electrochemical fuel cells can operate using various reactants. For example, the fuel stream may be substantially pure hydrogen gas, a gaseous hydrogen-containing reformate stream, or methanol in a direct methanol fuel cell. The oxidant may be substantially pure oxygen or a dilute stream such as air containing oxygen.

The fuel stream may contain impurities which do not contribute to, and may actually inhibit, the desired electrochemical reaction. These impurities may, for example, originate from the fuel stream supply itself, or may be generated in situ in the fuel cell, for example, as intermediate species during the fuel cell reactions. Further, impurities may enter the fuel stream from elsewhere in the system. Some of these impurities may be chemically adsorbed or physically deposited on the surface of the anode electrocatalyst, blocking the active electrocatalyst sites and preventing these portions of the anode electrocatalyst from inducing the desired electrochemical fuel oxidation reaction. Such impurities are known as electrocatalyst "poisons" and their effect on electrochemical fuel cells is known as "electrocatalyst poisoning". Electrocatalyst poisoning thus results in reduced fuel cell performance, where fuel cell performance is defined as the voltage output from the cell for a given current density. Higher performance is associated with higher voltage for a given current density or higher current for a given voltage.

In the absence of countermeasures, the adsorption or deposition of electrocatalyst poisons may be cumulative, so even minute concentrations of poisons in a fuel stream, may, over time, result in a degree of electrocatalyst poisoning which is detrimental to fuel cell performance.

Reformate streams derived from hydrocarbons or oxygenated hydrocarbons typically contain a high concentration of hydrogen fuel, but typically also contain electrocatalyst poisons such as carbon monoxide. To reduce the effects of anode electrocatalyst poisoning, it is known to pre-treat the fuel supply stream prior to directing it to the fuel cell. For example, pre-treatment methods may employ catalytic or other methods to convert carbon monoxide to carbon dioxide. However, known pre-treatment methods for reformate streams cannot efficiently remove 100% of the carbon monoxide. Even trace amounts less than 10 ppm can eventually result in electrocatalyst poisoning which causes a reduction in fuel cell performance.

Substances other than carbon monoxide are also known to poison fuel cell electrocatalysts. Depending on the type of fuel and the fuel processing methods, impurities in the fuel stream may be present in quantities sufficient to poison the electrocatalyst and reduce fuel cell performance. Fuel cell components and other fluid streams in the fuel cell system may also be a source of impurities which may result in poisoning of the electrocatalyst. For example, fuel cell separator plates are commonly made from graphite. Organic impurities in the graphite may leach out and poison the electrocatalyst. Other poisons may be generated by the reaction of substances in the reactant streams with the fuel cell component materials.

What constitutes a poison may depend on the nature of the fuel cell. For example, whereas methanol is the fuel in a direct methanol fuel cell, in a hydrogen fuel cell operating on a methanol reformate stream, traces of unreformed methanol can be detrimental to the electrocatalyst performance.

Conventional methods for addressing the problem of anode electrocatalyst poisoning include purging the anode with an inert gas such as nitrogen. However, such purging methods involve suspending the generation of power by the fuel cell, thus a secondary power source is needed to provide power while the fuel cell anode is being purged.

Another approach for removing poisons from an electrocatalyst comprises introducing a "clean" fuel stream containing substantially no carbon monoxide (or other poisons) to a poisoned fuel cell anode. Where the adsorption is reversible, an equilibrium process results in some rejuvenation of the electrocatalyst. However, a disadvantage of this approach is that it is generally not effective against irreversibly adsorbed poisons. Furthermore, the recovery of the anode electrocatalyst by such an equilibrium process can be very slow, during which time the fuel cell is not able to operate at full capacity.

Another approach to counteract carbon monoxide electrocatalyst poisoning is to continuously introduce a low concentration of oxygen into the fuel stream upstream of the fuel cell, as disclosed by Gottesfeld in U.S. Pat. No. 4,910, 099. However, there are several disadvantages to Gottesfeld's method which influence fuel cell performance and efficiency. For example, an oxygen bleed results in parasitic losses, undesirable localized exothermic reactions at the anode, and dilution of the fuel stream.

It is apparent from the prior art that there is a need for an improved method and apparatus for rejuvenating a fuel cell anode electrocatalyst by removing poisons therefrom, which does not involve suspending the availability of the fuel cell to generate power.

SUMMARY OF THE INVENTION

A fuel cell is operated to produce electrical power for an electrical load by supplying an oxidant stream to the fuel cell cathode, and a fuel stream to the fuel cell anode. The present method comprises periodically momentarily fuel starving at least a portion of the anode, while continuing to produce electrical power from the fuel cell. Typically, when the method is applied, the fuel cell performance after the momentary starvation is improved relative to the performance just prior to the momentary starvation, particularly during operation on a fuel stream comprising one or more electrocatalyst poisons. This effect is believed to be due to oxidation of electrocatalyst poisons, which is facilitated as the anode potential increases as occurs during fuel starvation at the anode. The method may be advantageously applied, for example, during operation of the fuel cell on reformate fuel streams comprising hydrogen (as the fuel), carbon monoxide and carbon dioxide.

The fuel cell is preferably a solid polymer fuel cell. The fuel and oxidant streams may be gaseous or liquid. The fuel cell may, for example, be a direct methanol fuel cell.

In a first embodiment, the method for momentarily fuel starving at least a portion of the fuel cell anode comprises periodically momentarily interrupting the supply of the fuel stream to the fuel cell anode. This can be accomplished, for example, by adjusting a valve upstream of the fuel cell anode, stopping a fuel supply pump, or diverting the fuel supply stream away from the fuel cell anode.

Where the fuel cell is one of a plurality of fuel cells, for example, arranged in a fuel cell stack, the method preferably comprises preventing the simultaneous interruption of the supply of fuel to each anode of the plurality of fuel cells. This reduces the fluctuation in electrical power output from the stack.

The first embodiment of the method may further comprise closing a valve downstream of the fuel cell anode substantially simultaneously with the interruption of supply of the fuel stream to momentarily prevent the fuel stream from being exhausted from the fuel cell.

In a second embodiment, the method for momentarily fuel starving at least a portion of the fuel cell anode comprises periodically introducing pulses of a substantially fuel-free fluid into the fuel stream upstream of the fuel cell anode. The substantially fuel-free fluid moves through the anode flow field, thereby momentarily fuel starving successive portions of the anode.

The substantially fuel-free fluid may contain some fuel, provided the fuel concentration is sufficiently low to induce momentary fuel starvation of portions of the anode with which the fluid is in is contact, and thereby give the desired recovery in performance of the fuel cell. Preferably the substantially fuel-free fluid contains essentially no fuel and is substantially unreactive at the fuel cell anode, for example, nitrogen, argon, helium and hydrocarbons. Alternatively, the substantially fuel-free fluid may comprise quantities of components which participate in and enhance the desired poison oxidation reactions but are not themselves catalyst poisons or detrimental to fuel cell performance. For example, substantially fuel-free fluids comprising water or oxygen may facilitate the oxidation of some electrocatalyst poisons. For example, the exhaust gas from the fuel cell cathode may be a suitable substantially fuel-free fluid comprising low concentrations of oxygen.

The fuel and the substantially fuel-free liquid may both be in the same phase or different phases. For example, the fuel stream may be a gas stream and the substantially fuel-free fluid may be a liquid, or the fuel stream may be a liquid and the substantially fuel-free fluid pulse may be gaseous, or the fuel stream and the substantially fuel-free fluid may both be gaseous or liquid. Where both streams are liquids it may be preferable if the substantially fuel-free fluid is immiscible with the liquid fuel stream. Where the liquid fuel stream comprises aqueous methanol, a suitable and convenient substantially fuel-free fluid may be water.

The method may comprise introducing a substantially fuel-free fluid pulse which is cooler than the internal operating temperature of the fuel cell. In this embodiment, the substantially fuel-free fluid may act as a coolant for the fuel cell. Similarly, substantially fuel-free fluid could be introduced at a temperature higher than the operating temperature of the fuel cell, in situations where it is desirable to raise the fuel cell operating temperature.

The method for introducing the substantially fluid-free pulse may comprise the steps of periodically closing a fuel supply valve to stop the flow of the fuel stream upstream of the fuel cell and simultaneously opening an interrupt valve to introduce a pulse of a substantially fuel-free fluid stream into the fuel stream. In a variation on this embodiment, the fuel supply stream is maintained at a lower pressure than the substantially fuel-free fluid stream, and the method of introducing the substantially fuel-free fluid comprises periodically opening an interrupt valve to introduce a pulse of a substantially fuel-free fluid stream into the fuel stream.

In a third embodiment, the method for momentarily fuel starving at least a portion of the fuel cell anode comprises periodically connecting a transient electrical load to draw electrical power from the fuel cell. Preferably, the rate of supply of the fuel stream to the fuel cell anode is not increased in response to the connection of the transient load, so that fuel in the fuel cell is consumed at a faster rate than it is supplied and at least a portion of the anode becomes fuel starved. The transient electrical load may comprise a capacitor which may be used to release an electrical charge, for example, when the power demand from the electrical load exceeds the power output of the fuel cell during times when the fuel cell is undergoing rejuvenation.

Where the fuel cell is one of a plurality of fuel cells, for example, arranged in a fuel cell stack, preferably the periodic connection of the transient load is not connected to draw electrical power from all the fuel cells simultaneously.

In any of the embodiments described above the momentary fuel starvation may be induced at regular time intervals, for example, by interrupting the fuel supply, introducing substantially fuel-free pulses or connecting a transient load at regular time intervals. Alternatively, the method may comprise monitoring an operational parameter of the fuel cell and adjusting the frequency with which the momentary fuel starvation is induced in response to the value of the monitored parameter. Similarly, the duration of the momentary fuel starvation may be fixed or varied, for example in response to a monitored operational parameter.

One or both the duration and frequency of the periodic momentary interruptions may be selected as a function of the concentration of the catalyst poisoning species in the fuel stream.

In the above embodiments, it is generally preferred that cell reversal is avoided. However, embodiment of the method for operating a fuel cell assembly comprising plurality of fuel cells, may comprise periodically fuel starving at least one, but not all, of the fuel cell anodes such that a momentary cell reversal occurs, while continuing to generate electrical power from the remaining cells. Preferably, the fuel starvation is limited so that the momentary cell reversal does not cause the oxidation of any of the fuel cell components.

In a first embodiment, a fuel cell apparatus comprises a fuel supply system for directing a fuel stream to an anode of the fuel cell, a flow controller for periodically momentarily interrupting the supply of the fuel stream to the anode, and an actuator associated with the flow controller for controlling the frequency and duration of the interruptions.

The flow controller may comprise a fuel supply valve located upstream of the anode, and the actuator is preferably connected to periodically partially or preferably fully close the fuel supply valve to interrupt the fuel supply to the anode. The fuel cell apparatus may further comprise a fuel exhaust stream valve located downstream of the anode which is activated by the actuator (or a second actuator activated in coordination with the first actuator) to open and close in coordination with the fuel supply valve.

The fuel supply system may comprise a pump for directing a fuel stream to the anode. In this embodiment, the actuator may, for example, be connected to periodically deactivate the pump and thereby interrupt the fuel supply to the anode. A fuel exhaust stream valve located downstream of the anode may be activated by the actuator in coordination with the pump activation to close the valve when the pump is periodically deactivated, and open the valve when the pump is re-activated.

The flow controller may comprise a diverter located upstream of the anode for diverting the fuel stream away from the anode. The diverter may be periodically actuated by the actuator.

A sensor may be employed for detecting the concentration of catalyst poisons in the fuel stream. The sensor may provide an output signal to the actuator which adjusts the frequency and/or duration of the interruptions in response to the sensor output signal.

The fuel cell may comprise a plurality of independent fuel flow field channels for directing the fuel stream in contact with the anode. Each one of the flow field channels directs the fuel stream to a discrete region of the anode and the supply of the fuel stream to each one of the regions can be controlled independently from the supply of the fuel stream to other ones of the regions. In this embodiment, selected regions of the anode can be fuel starved while other regions continue to contribute to the fuel cell power output.

In a second embodiment, a fuel cell apparatus comprises a fuel supply system for directing a fuel stream to an anode of the fuel cell, a source of a substantially fuel-free fluid, and a flow controller for periodically introducing pulses of the substantially fuel-free fluid into the fuel stream upstream of the fuel cell anode. The flow controller may comprise an interrupt valve for controlling the introduction of the substantially fuel-free fluid stream into the fuel stream. In one example of such an embodiment, the source of substantially fuel-free fluid may include the oxidant exhaust stream from the fuel cell. In this embodiment, the interrupt valve may be fluidly connected to an oxidant stream outlet of the fuel cell.

In a third embodiment, a fuel cell apparatus comprises a transient electrical load which is selectively electrically connected to draw electrical power from the fuel cell. A switch periodically momentarily electrically connects the transient electrical load to draw electrical power from the fuel cell. An actuator associated with the switch controls the frequency and duration of the electrical connection. The transient load may comprise a capacitor for storing an electrical charge which can be released to the electrical load.

The embodiments described above may be used to improve fuel cell performance and increase the service life of an electrochemical fuel cell.

BRIEF DESCRIPTION OF THE DRAWINGS

The advantages, nature and additional features of the invention will become more apparent from the following description, together with the accompanying drawings, in which.

DETAILED DESCRIPTION OF PREFERRED EMBODIMENTS

The present invention teaches a method and apparatus for operating an electrochemical fuel cell with periodic fuel starvation at the anode while not suspending the generation of power. In the context of this disclosure, fuel starvation is defined as a reduction in fuel supply to the anode electrocatalyst which results in the anode potential increasing (that is, moving towards the positive cathode potential). It is believed that an increased anode potential results in the oxidation and removal of poisons from the fuel starved portion of the anode electrocatalyst.

Figure 1:
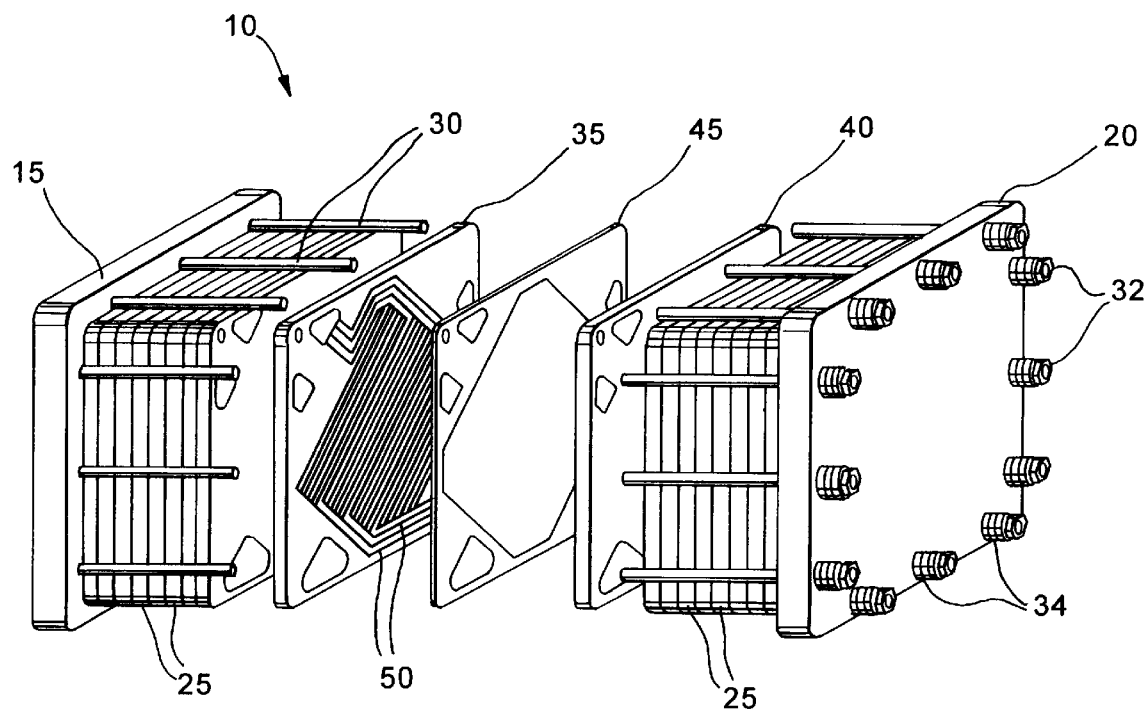
FIG. 1 is an exploded view of a conventional fuel cell stack (prior art)

FIG. 1 illustrates, in exploded view, a solid polymer fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34 threaded on tie rods 30 interposed between fastening nuts 32 and end plate 20 apply resilient compressive force to stack 10 in the longitudinal direction. Reactant and coolant fluid streams are supplied to and exhausted from internal manifolds and passages in stack 10 via inlet and outlet ports (not shown in FIG. 1) in end plate 15. As shown by the exploded portion of FIG. 1, each fuel cell assembly 25 includes an anode flow field plate 35, a cathode flow field plate 40, and an MEA 45 interposed between plates 35 and 40.

Plates 35 and 40 act as current collectors and provide a fluid barrier for separating reactant fluids supplied to the anode and cathode. At the interface between MEA 45 and plates 35 and 40, fluid flow fields 50 direct the reactant fluids to the electrodes. Fluid flow field 50 typically comprises a plurality of fluid flow channels formed in the major surfaces of plates 35 and 40 facing MEA 45.

One purpose of fluid flow field 50 is to distribute the reactant fluid to the entire surface of the respective electrodes, namely the anode on the fuel side and the cathode on the oxidant side.

FIGS. 2 and 4 through 7 are schematic depictions of various examples of apparatus which may be used to periodically momentarily fuel starve at least a portion of the anodes in fuel cell stack 100. Stack 100 includes end plates 130, 140, a fuel inlet port 150 in end plate 130, and a fuel supply manifold 160 for supplying a fuel stream to a plurality of individual fuel cells.

Fuel flow fields associated with each fuel cell are represented by lines 170. A fuel exhaust manifold 180 removes the fuel depleted stream from stack 100 through fuel outlet port 190 in end plate 140. Stack 100 also has a similar arrangement of ports, manifolds and flow fields (not shown) for supplying and exhausting an oxidant stream to and from stack 100.

The fuel stream is directed to stack 100 from a fuel source such as a reservoir, storage tank 102, pressurized storage vessel 105 (see FIG. 5), or fuel processor, for example, comprising a reformer. In some embodiments, (see FIGS. 2, 4 and 6), especially when the fuel source is not pressurized, a pump 110 may be used to direct the fuel stream to stack 100.

Fuel supply valve 120 controls the supply of fuel to stack 100. Fuel supply to stack 100 may be interrupted by closing fuel supply valve 120.

Figure 2:
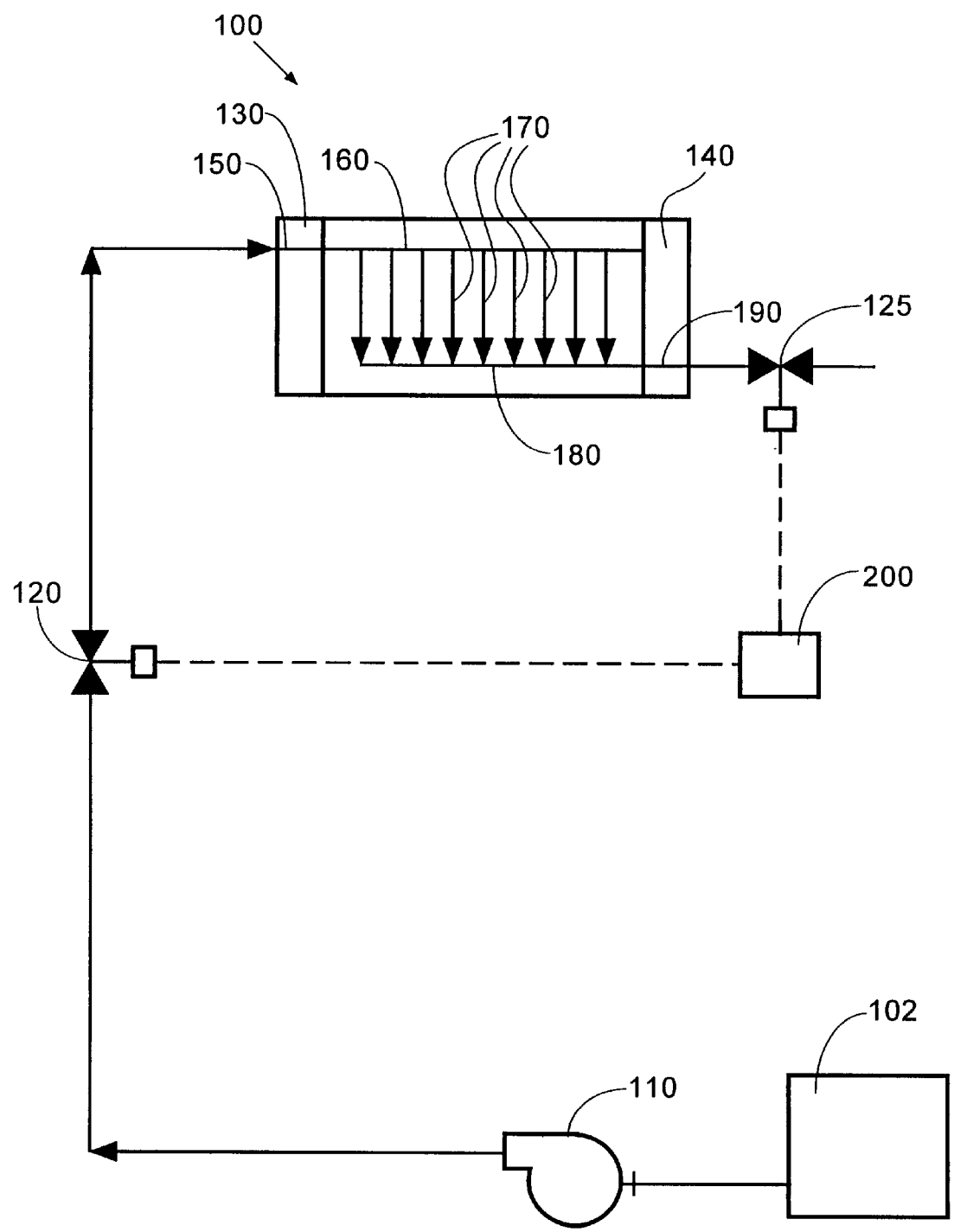
FIGS. 2 and 4 through 7 are schematic illustrations of embodiments of the apparatus of the invention.

Referring now to FIG. 2, when fuel cell stack 100 is connected and operating to deliver electrical power to a load, and fuel supply valve 120 is closed or adjusted to reduce the rate of supply of fuel to less than that demanded to satisfy the load, the fuel cell anodes become fuel starved. The cell voltage drops and the anode potential increases as the fuel inside stack 100 is consumed by the electrochemical reaction which is induced to supply electrical current to the electrical load. In the preferred method, the increase in anode potential results in the oxidation of electrocatalyst poisons. The oxidized poisons become part of the fuel exhaust stream. Preferably, the extent to which the anode is fuel starved and the resultant cell voltage drop is controlled by opening fuel supply valve 120 before cell reversal occurs. Cell reversal occurs when the anode potential increases and becomes more positive than the cathode potential, resulting in a negative cell voltage. In this situation the cell is consuming, rather than producing, electrical power. Momentary instances of slight cell reversal may not damage the fuel cell, but prolonged cell reversal or large negative cell voltages can cause permanent damage. Cell reversal may result in the production of oxygen at the anode through the oxidation of water. Initially, the oxygen produced by cell reversal may momentarily assist in the oxidation of electrocatalyst poisons, but after a more prolonged period, permanent damage may be caused by the oxidation of some of the fuel cell components. Accordingly, it is preferable to control the duration and frequency of the periodic fuel supply interruptions, using controller 200, to avoid cell reversal while still achieving the desired removal of poisons from the fuel cell electrocatalyst.

The preferred duration depends upon many factors. For example, these factors include the type and concentration of the electrocatalyst poisons, the cell design, the physical characteristics of the fuel cell, the fuel flow rate, reactant pressure, and reactant stoichiometry. The duration of the periodic fuel supply interruptions may be, for example, increased until the fuel cell almost ceases to produce useful electrical power or reaches a condition where cell reversal is about to occur. Fuel cell operating parameters which are indicators of such conditions may be monitored to determine when these limits are approached. The duration of fuel starvation may be adjusted in response to one or more monitored fuel cell operating parameters to enhance poison removal while preventing permanent damage to the fuel cell caused by cell reversal. Suitable operating parameters may include cell voltage, current, power output, poison concentration in the fuel stream and temperature.

With respect to frequency, the interruptions may be spaced at fixed time intervals or variable time intervals which are adjusted according to factors such as, for example, the concentration of poisons to which the anode electrocatalyst is exposed, and the configuration of the flow field. For example, for fuel cells subjected to lower poison concentrations, it is possible to lengthen the intervals between periodic fuel supply interruptions.

In some cases the balance between the duration and frequency of interruptions should be considered in view of the particular application for which the fuel cell is used. For example, some applications are more sensitive to one of either the magnitude or frequency of power fluctuations. That is, if the fuel cell is used for an application which is sensitive to the frequency of power fluctuations, it may be desirable to periodically starve the fuel cell for longer durations at a lower frequency. Conversely, other applications may be more sensitive to the magnitude of power fluctuations, in which case it may be preferable to increase the frequency of fuel supply interruptions and decrease the duration of each periodic interruption.

Closing fuel supply valve 120 may cause an increase in the transmembrane pressure differential across the MEAs. To avoid damage to the ion exchange membrane, preferably controller 200 opens and closes fuel exhaust valve 125 substantially simultaneously with fuel supply valve 120. In this way, the anode will be fuel starved once the fuel remaining in stack 100 is consumed, but there will not be a significant sudden pressure drop on the fuel side of the MEA.

In another embodiment of an apparatus, the effect of power output interruptions can be reduced by dividing the electrochemically active areas of each fuel cell into separate regions, with each region having a separate fuel flow field and fuel supply valve 120. Then the interruption of the fuel supply to different regions of the same fuel cell can be staggered, so that not all portions of the active area are starved at the same time.

In some embodiments, fuel supply manifold 160 may comprise a mechanism, such as for example a rotary valve disposed within manifold 160, for controlling the distribution of fuel to the individual fuel cells. Preferably, the rotary valve controls the fuel supply stream to prevent the simultaneous interruption of the fuel supply stream to all of the fuel cells in stack 100.

In applications where a plurality of fuel cell stacks are used in combination to supply electrical power it is advantageous to stagger the timing for the fuel interruptions to each stack to reduce the effect of the interruptions on total power output.

In variations of the embodiment illustrated in FIG. 2, periodic interruptions in the supply of fuel to stack 100 may be accomplished without using a fuel supply valve 120, by using controller 200 to periodically stop pump 110 thereby stopping the supply of fuel to stack 100, or by periodically temporarily diverting the fuel stream away from the stack fuel inlet port 150.

Figure 3:
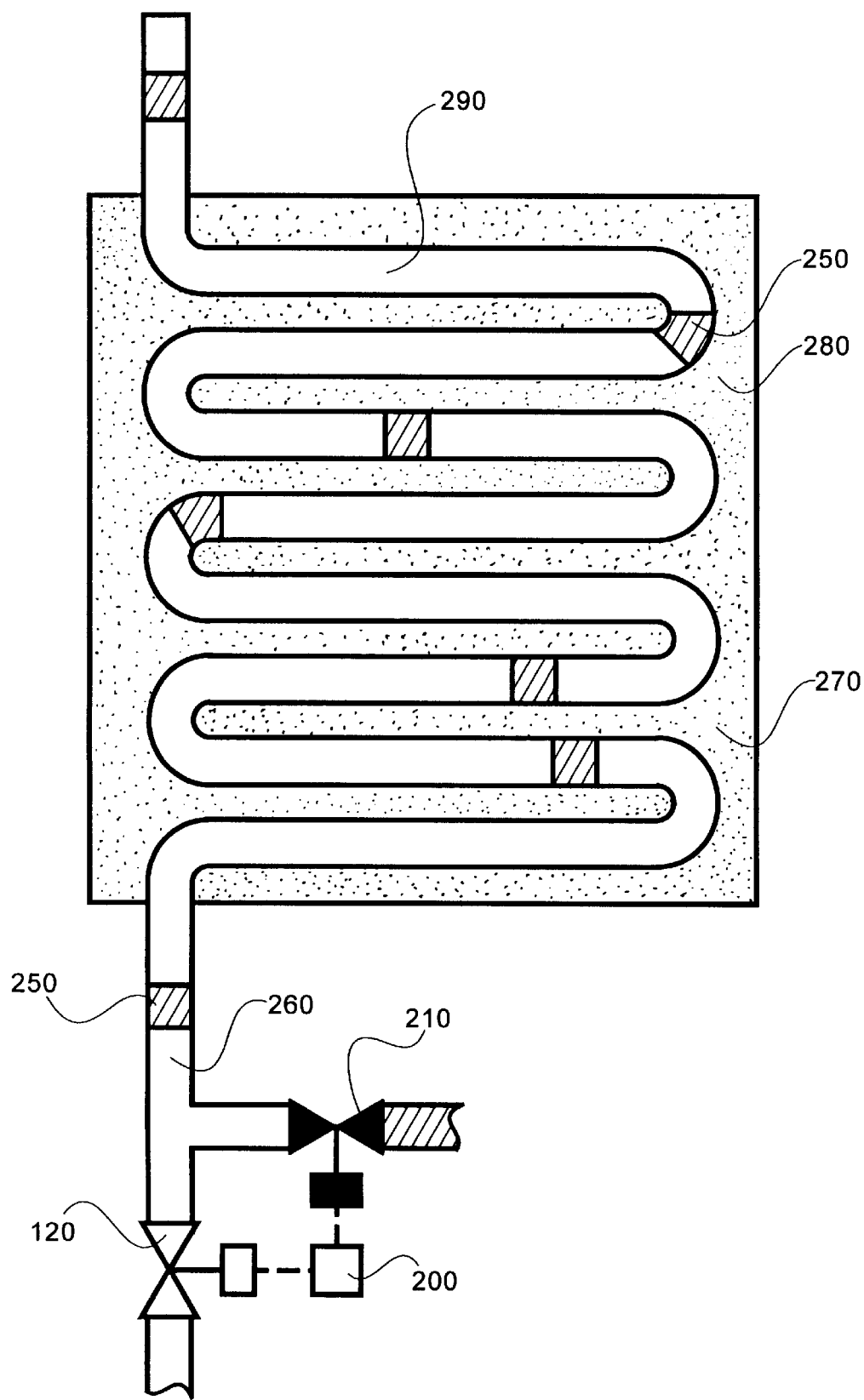
FIG. 3 is a diagram of a fuel flow field and anode depicting substantially fuel-free fluid pulses moving through the fuel flow field in the fuel stream.

In other embodiments of the method, localized starvation of the anode is accomplished by introducing substantially fuel-free fluid pulses 250 into the fuel stream using apparatus such as that illustrated in FIG. 3. In operation, with reference to the embodiment depicted by FIGS. 3 and 4, fuel supply valve 120 is open and interrupt valve 210 is closed. Periodically interrupt valve 210 is momentarily opened while controller 200 synchronously closes fuel supply valve 120, thereby introducing substantially fuel-free fluid pulses 250 into fuel stream 260. The substantially fuel-free fluid may be introduced from a fluid source such as vessel 215 in FIG. 4. In these embodiments, controller 200 coordinates the operation of valves 120 and 210 so that they remain in opposite open or closed positions. An advantage of this approach is that it is less likely to create a sudden change in transmembrane pressure differential across the MEAs compared to interrupting the fuel supply as described above.

Preferably, the substantially fuel-free fluid stream 250 is introduced into the fuel stream 260 at substantially the same pressure that the fuel stream is supplied to stack 100. It is believed that this promotes the flow of a discrete substantially fuel-free fluid pulse through the fuel side flow field. A large pressure differential between the fuel stream and the substantially fuel-free fluid stream may cause the higher pressure fluid to disperse into the lower pressure fluid, reducing the localized starvation effect.

The flow field design may also affect the extent to which the fluid streams mix as they move through the fuel cells. It may be desirable to control the pressures and design the flow field to reduce mixing which may inhibit the formation of localized fuel starvation conditions at the anode.

The fluid pressures need not be precisely matched. In some embodiments it may be desirable for the substantially fuel-free fluid to be at a slightly higher pressure than the fuel stream. An advantage of this is that the slight pressure differential will prevent fuel from contaminating the substantially fuel-free fluid source, and the substantially fuel-free fluid can be introduced into the fuel stream by opening interrupt valve 210, without the necessity of closing fuel supply valve 120.

The volume of the substantially fuel-free fluid pulses 250 can be as much as the open volume of fuel flow field 290 and porous anode 270. However, preferably, the volume of substantially fuel-free fluid pulses 250 is much less than the open volume of fuel flow field 290 and porous anode 270, thereby ensuring that the majority of each anode 270 remains saturated with fuel and electrochemically active. The electrochemically active areas continue to be available to produce an electrical current while only successive localized portions 280 of the active area are momentarily fuel starved to oxidize and remove electrocatalyst poisons. Using this embodiment it is possible to reduce cell voltage fluctuations which may occur when the entire anode 270 is simultaneously fuel starved. Accordingly, it is desirable for the volume of substantially fuel-free fluid pulses 250 to be less than the open channel volume of fuel flow field 290.

A variety of gases or liquids are suitable for use as the substantially fuel-free fluid. The choice of substantially fuel-free fluid depends upon factors such as cost, compatibility, effectiveness, and availability of the fluid elsewhere in the fuel cell system. The substantially fuel-free fluid may be unreactive or may comprise reactive components which participate in and enhance the desired poison oxidation reactions but are not themselves catalyst poisons, for example, water and/or traces of oxygen may participate in and enhance the oxidation of some poisons. The preferred substantially fuel-free fluid may depend upon the nature of the anode catalyst and the poison to be oxidized.

The fuel stream and the substantially fuel-free liquid may be in different phases. For example, the fuel stream could be gaseous hydrogen or reformate and the substantially fuel-free fluid could be liquid water. In conventional fuel cells, it is considered important to manage water inside the fuel to sufficiently hydrate the membrane and avoid two phase flow since water in the fuel stream inhibits the diffusion of fuel to the anode. According to the present method, an object of the method is to inhibit the supply of fuel to starve at least a portion of the anode.

Figure 5:
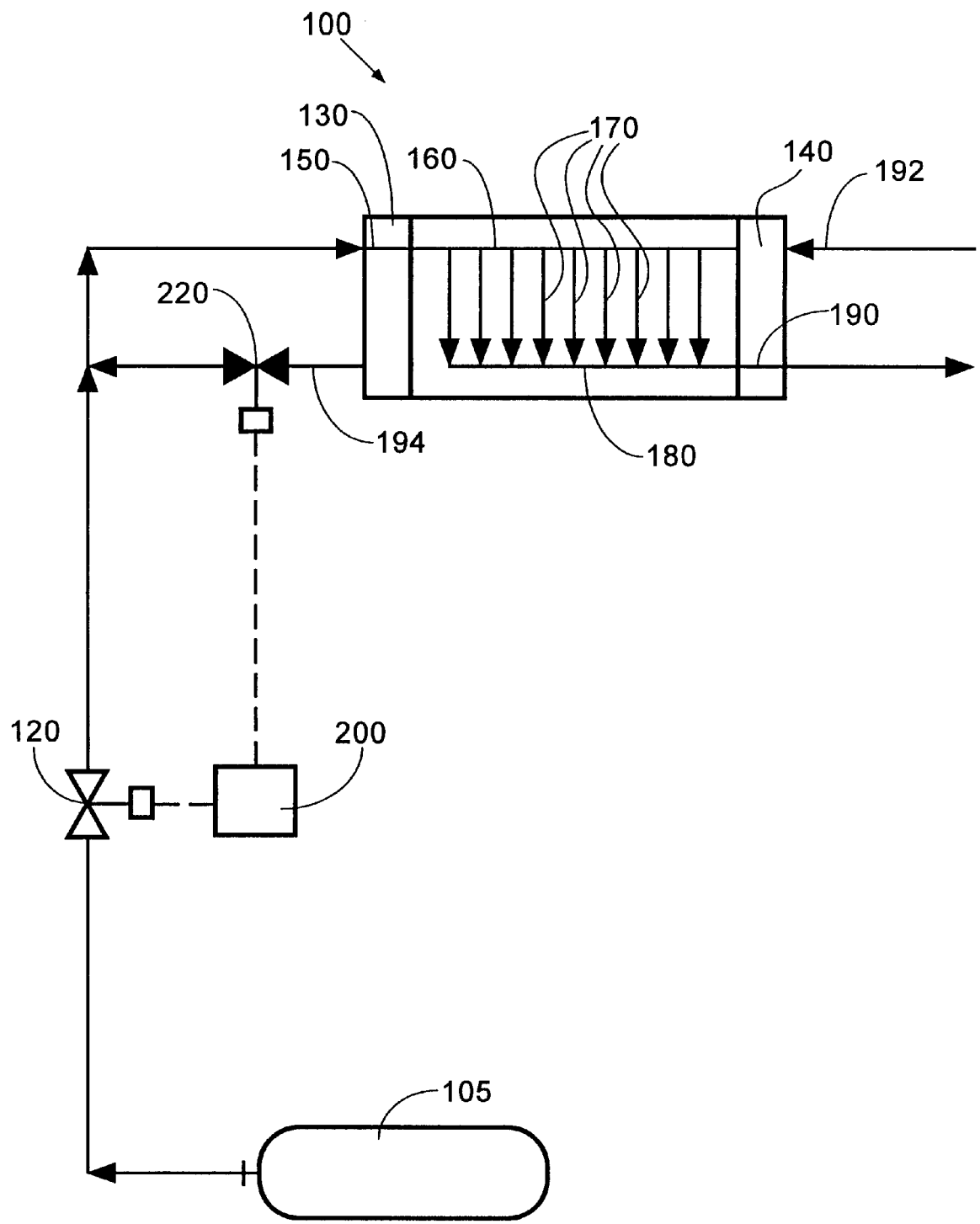

FIG. 5 shows stack 100 having an oxidant inlet 192, for directing an oxidant stream to the cathodes of fuel cell in stack 100, and an oxidant exhaust outlet 194. In the embodiment depicted by FIG. 5, interrupt valve 220 is positioned on a fluid line which connects oxidant outlet 194 with a stack fuel supply system. In operation, fuel supply valve 120 is periodically momentarily closed while interrupt valve 220 is periodically momentarily opened to introduce pulses of oxidant exhaust stream (from the fuel cell cathodes) into the fuel flow fields. An advantage of utilizing the oxidant exhaust stream as the substantially fuel-free fluid is that it typically contains some residual oxygen which can help in the oxidation and removal of poisons from the anode. The oxidant exhaust stream also typically contains moisture which is useful for humidifying the anode and the water may also participate in the oxidation reactions which result in the oxidation and removal of poisons from the anode. Yet another advantage of utilizing the oxidant exhaust stream is that this fluid stream is already present in the fuel cell system, so there is no need to provide a separate substantially fuel-free fluid source.

Other fluid streams present in the fuel cell system may be suitable for use as the substantially fuel-free fluid (for example, process streams, and burner exhaust gases). A process stream such as methane may be diverted to stack 100, from upstream of the reformer, to act as the substantially fuel-free fluid. Alternatively, fuel cell systems employing reformers typically use a burner as part of the reforming apparatus. The reforming process may use fuel cell oxidant and fuel exhaust streams as combustion gases. After combustion, the burner exhaust stream may be suitable for use as the substantially fuel-free fluid. Also the exhaust stream from the anode, which with dilute fuel streams has a substantially lower fuel content than the inlet fuel stream, may be suitable.

Figure 6:
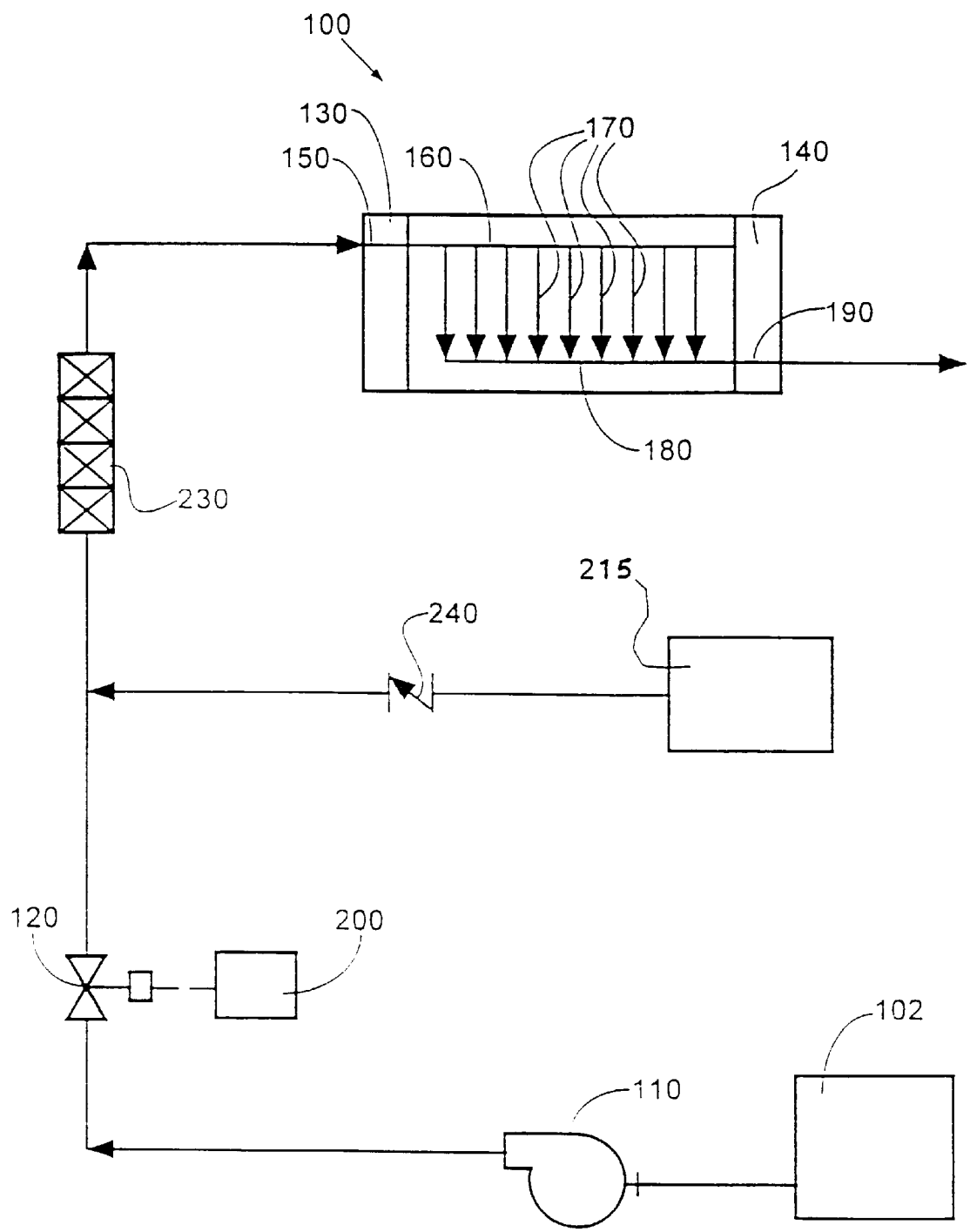

In operation, using the embodiment of FIG. 6, a continuous supply of substantially fuel-free liquid, such as water is added to and mixed with a liquid fuel stream comprising, for example, methanol in a direct methanol fuel cell system. A static mixer 230 may be used to improve the mixing of the two liquids. Check valve 240 prevents fuel from contaminating the substantially fuel-free liquid. Fuel supply valve 120 is periodically momentarily closed, so that pulses of only the substantially fuel-free liquid are introduced into the fuel stream which is directed to stack 100.

An advantage of using a substantially fuel-free fluid comprising water with non-aqueous reactant streams is that it will also hydrate the membrane and reduce the need for humidifying the reactant streams.

In other embodiments, the method may also be used to cool stack 100 by introducing a fluid which is cooler than stack 100 as the substantially fuel-free fluid pulse. An advantage of using a coolant as the substantially fuel-free fluid is that it may reduce or eliminate the need for separate cooling plates and channels, thereby increasing the power density of the fuel cell stack. Further, if the cooling function is combined with the fuel supply system this reduces the complexity of the overall fuel cell system. Where it is anticipated that the fuel cell will be subjected to an operating environment where ambient temperatures will be less than 0° C., a non-corrosive substantially fuel-free cooling fluid with a freezing point lower than that of water may be preferred.

Controller 200 is shown in all of the illustrated embodiments. Controller 200 controls the interruptions of the fuel supply stream by controlling both the opening and closing of valves, or the operation of pump 110. In one embodiment, controller 200 comprises a timer which causes controller 200 to periodically open and close fuel supply valve 120 and/or interrupt valve 210, at regularly spaced intervals. In other embodiments, controller 200 responds to monitored operating parameters such as cell performance to govern the intervals between interruptions in the fuel supply and the duration of such interruptions. The monitored operating parameters may include any of the fuel cell operating parameters described herein.

The duration of the fuel supply interruptions may be of fixed length or controller 200 may close fuel supply valve 120 until fuel starvation conditions are momentarily reached in at least a portion of the anodes in stack 100. Controller 200 may also control interrupt valve 210 in coordination with fuel supply valve 120 so that when fuel supply valve 120 is opened, interrupt valve 210 is closed, and vice versa.

Figure 4:
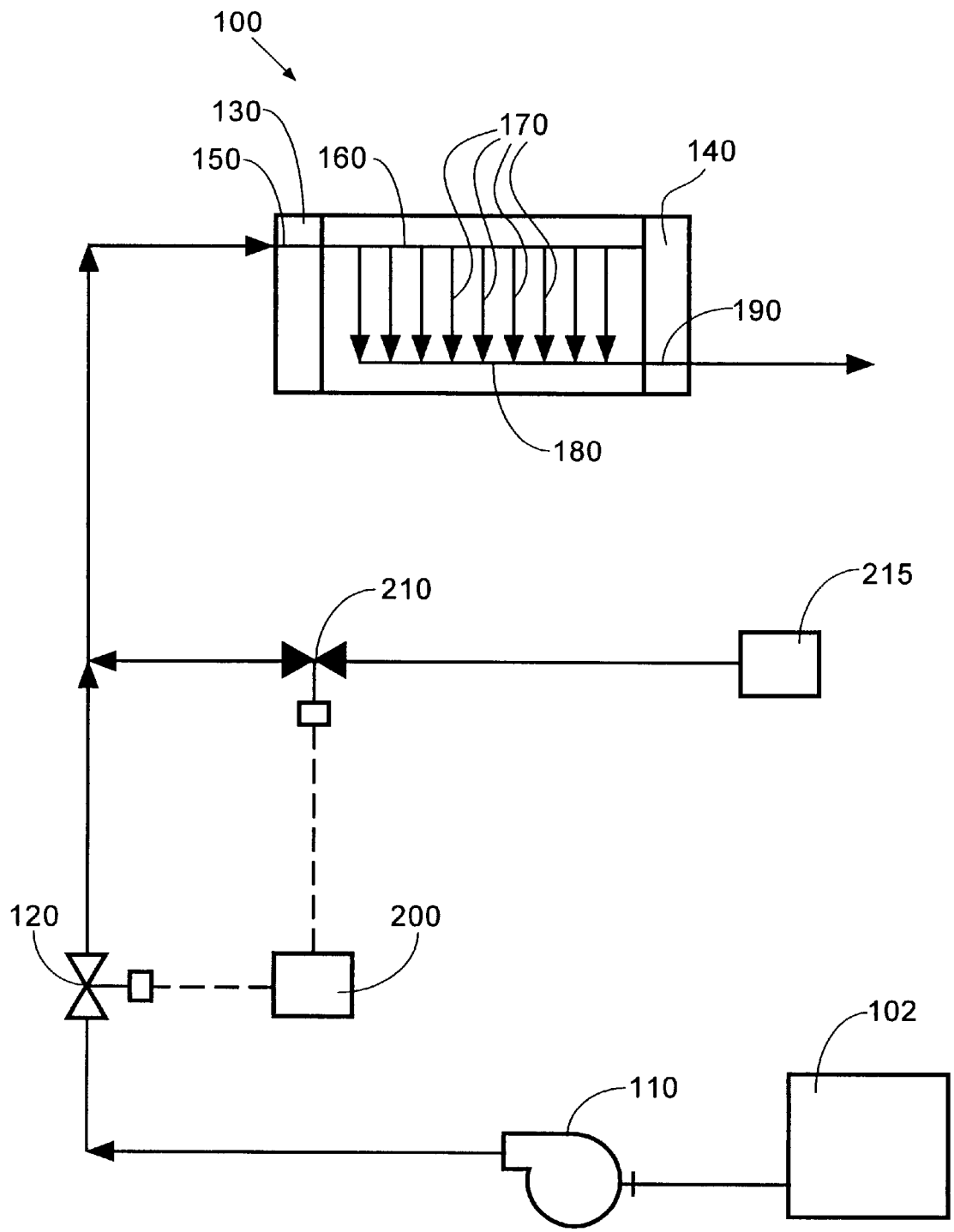

In the embodiments of FIGS. 4 and 5, fuel supply valve 120 may not be necessary, for example, if the pressure of the substantially fuel-free fluid is higher than the pressure of the fuel stream at the point of introduction. Then only interrupt valve 210 may be needed to introduce the higher pressure fluid into stack 100, thus interrupting the fuel supply stream.

Figure 7:
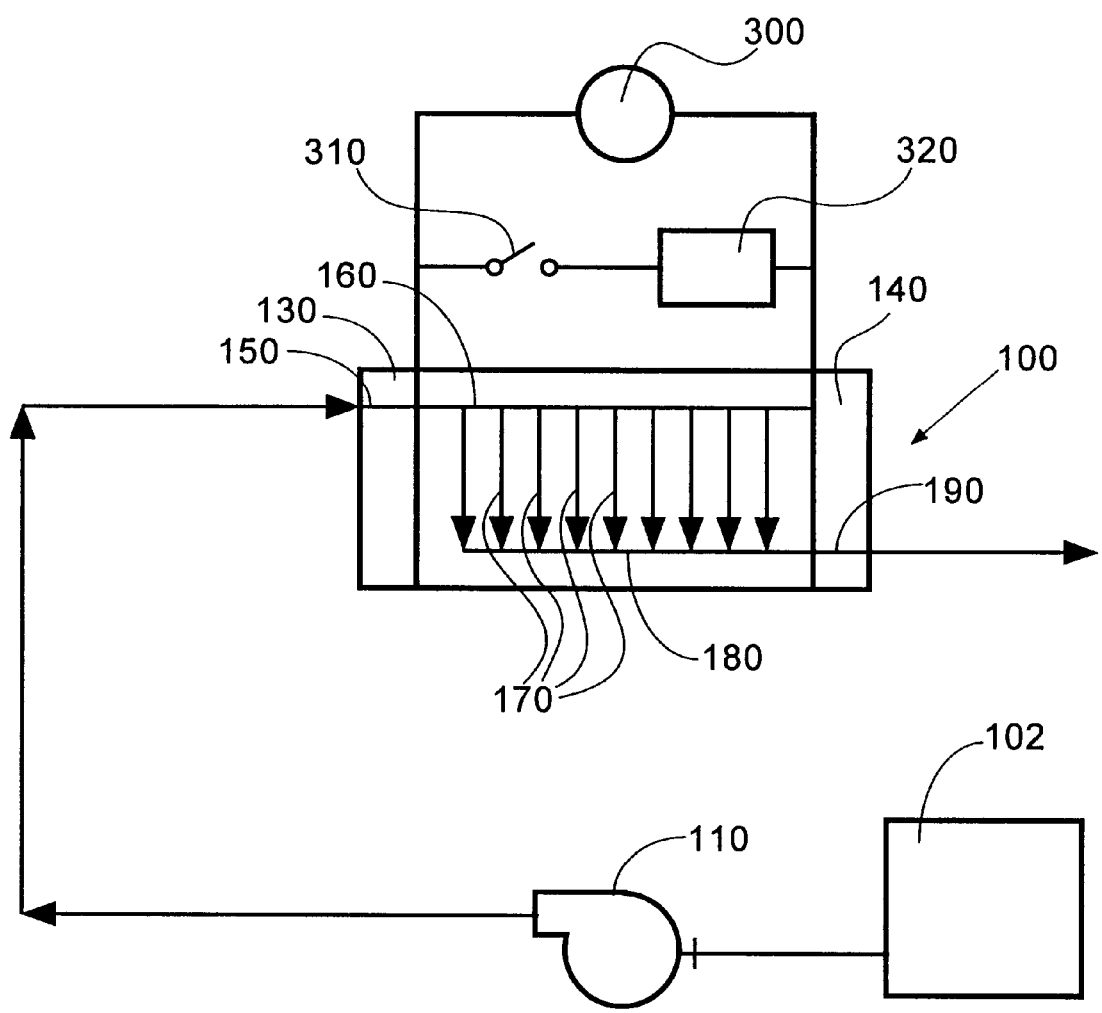

FIG. 7 depicts a stack 100 which is connected to electrical load 300. In the embodiment illustrated by FIG. 7, the fuel cell anodes in stack 100 are fuel starved by operating switch 310 to connect transient load 320 to stack 100, without correspondingly increasing the rate of fuel supply to the anode. Transient load 320 demands electrical current which causes fuel in stack 100 to be consumed more rapidly than fuel is supplied. The frequency and duration of the fuel starvation can be controlled, as with the other embodiments by a controller (not shown), except that in this embodiment the controller operates switch 310.

The controller may be used to periodically operate switch 310 at regular or variable time intervals. One or more operating parameters of the fuel cell may be monitored to determine when the controller will automatically operate switch 310. The same, or additional operating parameters may be monitored to determine how long transient load 320 is connected to receive electrical power from stack 100.

The power drawn by transient load 320 may be variable so that the severity of the fuel starvation is adjustable.

The transient load may comprise a capacitor which is connected in parallel so that an electrical charge may be released to power load 300 when fuel cell power output is reduced by electrocatalyst poisoning or rejuvenation cycles.

EXAMPLE 1

Figure 8:
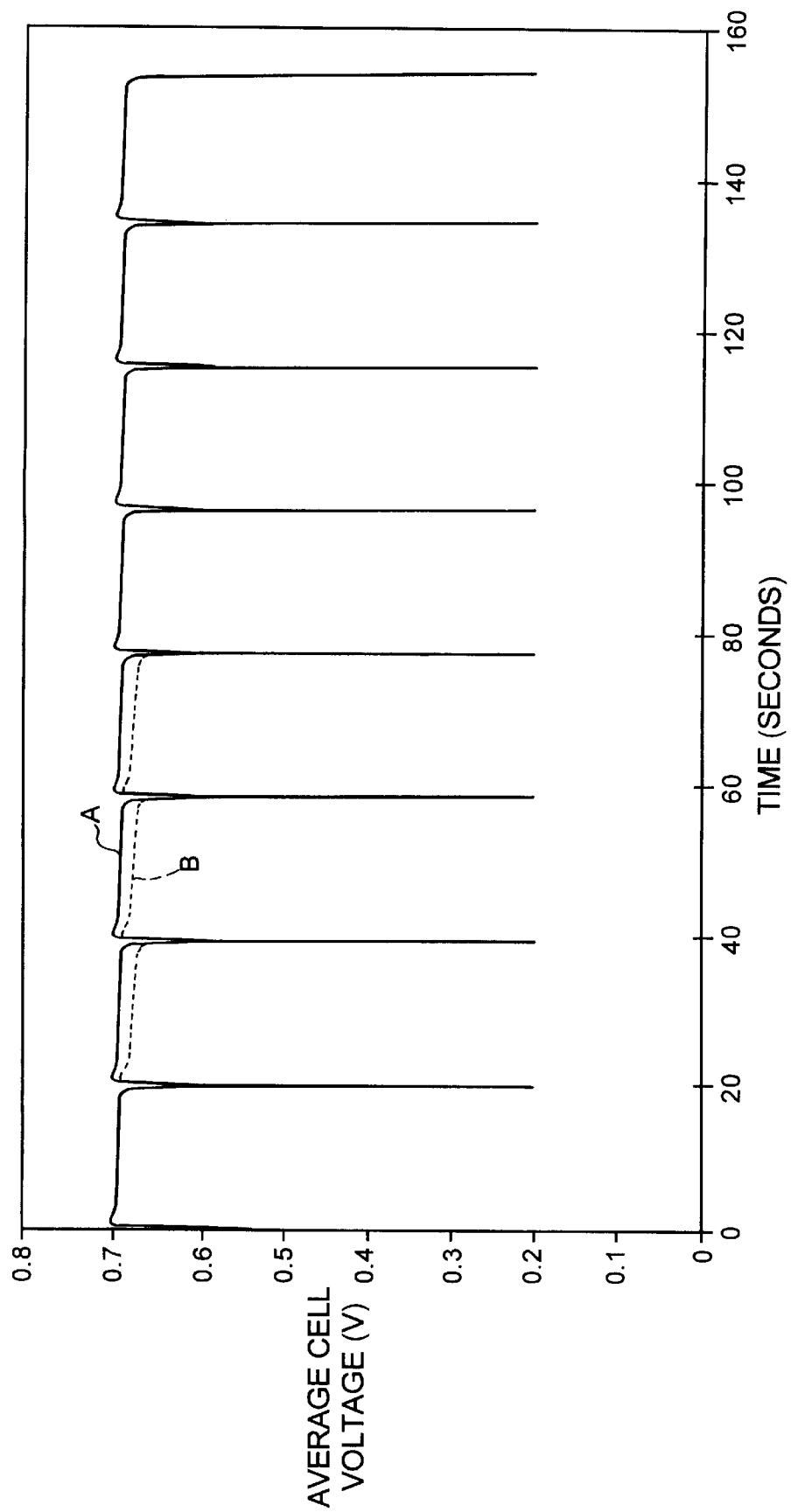
FIG. 8 is a graph plotting average cell voltage against time, showing the effect of periodic fuel supply interruptions.

FIG. 8 is a graph of average cell voltage plotted against time for a Ballard Mark 8 fuel cell stack supplied with a reformate fuel stream having a composition of 75% hydrogen, 25% carbon dioxide and trace amounts of impurities, including poisons (e.g. 20 ppm or 100 ppm carbon monoxide). The fuel cell was operating at a current density of 600 amps per square foot. The reformate fuel stream supply to the stack was interrupted for 1 second every 18 seconds by closing a fuel supply valve. FIG. 8 shows that after periodic momentary fuel starvation cycles the fuel cell performance was restored and enhanced. It is believed that the enhanced fuel cell performance was the result of electrocatalyst rejuvenation caused by the removal of poisons from the electrocatalyst.

As shown by plots A and B, the periodic momentary fuel starvation cycles caused momentary decreases in the cell voltage. Plot A represents data obtained from an operating fuel cell supplied with a reformate fuel stream containing 10 ppm carbon monoxide. The average cell voltage with the voltage dips taken into account was 0.673 V. Plot B (dotted lines) represents data obtained from an operating fuel cell supplied with a reformate fuel stream containing 100 ppm carbon monoxide. At 100 ppm carbon monoxide, the average cell voltage with the voltage dips taken into account was 0.660 V.

However, the data from both plots A and B show that cell voltage remained positive, thereby avoiding the problem of cell reversal. Therefore, FIG. 8 shows that it is possible, using an apparatus such as that illustrated in FIG. 2, to periodically starve the fuel cell and remove poisons from the electrocatalyst while still generating a continuous supply of power.

EXAMPLE 2

Figure 9:
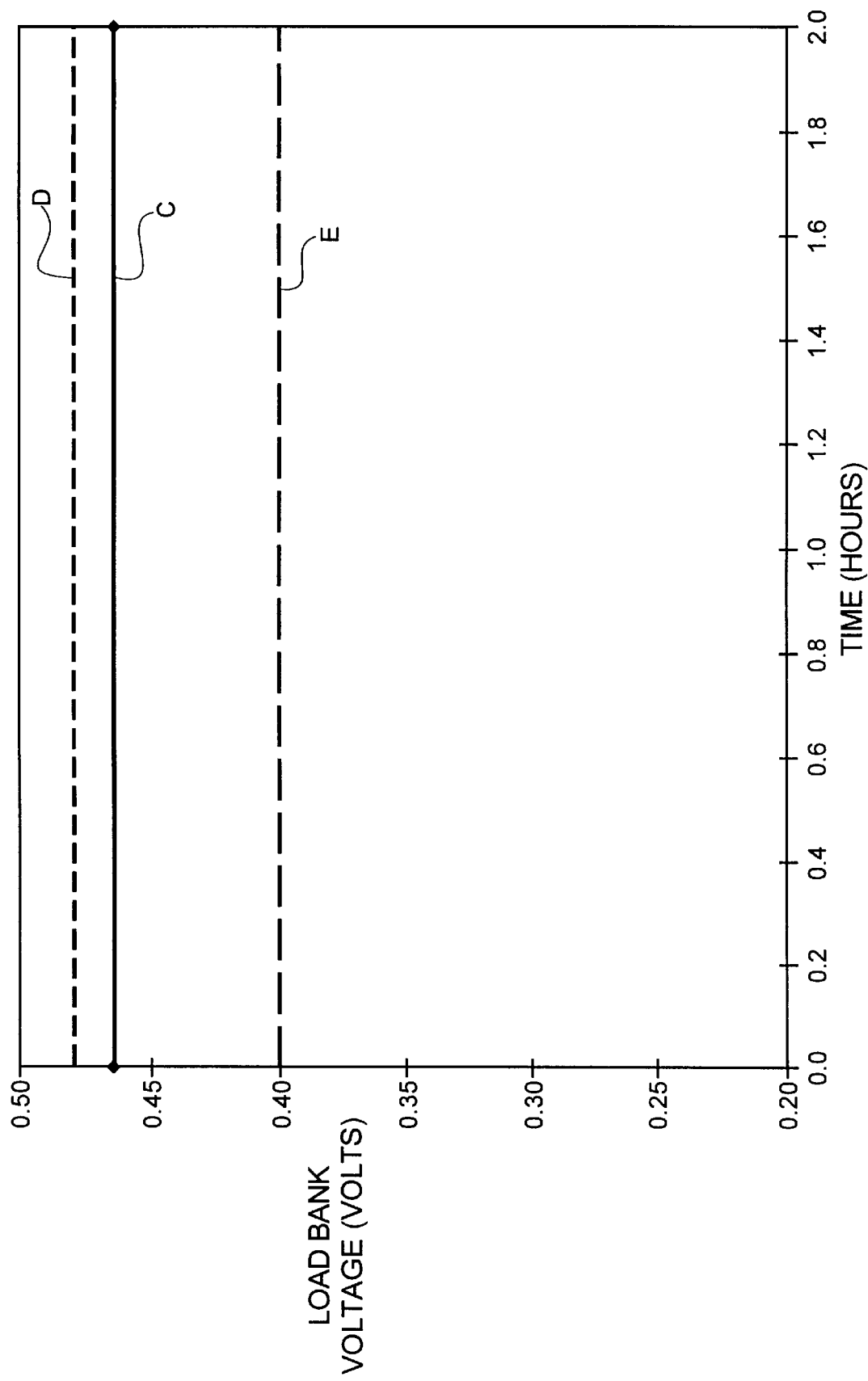
FIG. 9 is a graph plotting average cell voltage against time, showing the effect of periodic fuel supply interruptions with coordinated introductions of pulses of a substantially fuel-free fluid.

FIG. 9 is a plot of average cell voltage plotted against time for a single cell Ballard Mk5E fuel cell using as the anode catalyst a platinum/ruthenium mixture, where nitrogen pulses were introduced into the fuel stream directed through the fuel flow field. The reformate fuel stream included 72% hydrogen, 19% carbon monoxide and 40 ppm carbon monoxide. The fuel cell was operating at a current density of 500 amps per square foot. The fuel supply was periodically interrupted and nitrogen pulses were introduced for 0.5 second durations at 5 second intervals. With reference to FIG. 9, Plot C is a plot of the average cell voltage, with high and low fluctuations taken into account. Plot D is a plot of the upper performance limit (i.e. peak cell voltage). Plot E is a plot of the lower performance limit. By using shorter interruptions, it is believed that, substantially fuel-free fluid pulses moving through the flow field result in localized fuel starved portions of the anode, while the majority of the anode remains electrochemically active. The difference between the upper and lower performance limits is about 0.08 volts. It is believed that this is the reason for the reduction in the magnitude of cell voltage fluctuations, compared to FIG. 8 where average cell voltage fluctuated by approximately 0.5 volts between a high of about 0.7 volts and a low of about 0.2 volts.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications which incorporate those features coming within the spirit and scope of the invention.

What is claimed is:

1. A method of operating a solid polymer electrolyte fuel cell, said method comprising:

supplying an oxidant stream to the cathode of said fuel cell;

supplying a fuel stream to the anode of said fuel cell; and periodically fuel starving at least a portion of said anode, while continuing to produce electrical power from said fuel cell.

2. The method of claim 1 wherein said method comprises periodically interrupting the supply of said fuel stream to said fuel cell anode.

3. The method of claim 2 wherein said solid polymer electrolyte fuel cell is one of a plurality of solid polymer electrolyte fuel cells in a fuel cell stack.

4. The method of claim 3 wherein the supply of fuel to each anode of said plurality of fuel cells is not simultaneously interrupted.

5. The method of claim 2 wherein the supply of said fuel stream to said fuel cell anode is interrupted at regular time intervals.

6. The method of claim 2 further comprising closing a valve downstream of said fuel cell anode substantially simultaneously with said interruption of supply of said fuel stream to prevent said fuel stream from being exhausted from said fuel cell anode.

7. The method of claim 2 further comprising:

monitoring an operational parameter of said fuel cell; and adjusting the frequency with which said fuel supply stream to said fuel cell anode is interrupted responsive to said monitored parameter.

8. The method of claim 2 further comprising:

monitoring an operational parameter of said fuel cell; and adjusting the duration of said interruption of said fuel supply stream to said fuel cell anode responsive to said monitored parameter.

9. The method of claim 1 wherein said method comprises periodically introducing pulses of a substantially fuel-free fluid into said fuel stream upstream of said fuel cell anode, whereby successive portions of said anode are fuel starved.

10. The method of claim 9 wherein said pulses of substantially fuel-free fluid are introduced into said fuel stream at regular time intervals.

11. The method of claim 9 further comprising:

measuring an operational parameter of said fuel cell; and adjusting the frequency with which said pulses of substantially fuel-free fluid are introduced into said fuel stream responsive to said measured operational parameter.

12. The method of claim 9 further comprising:

measuring an operational parameter of said fuel cell; and adjusting the volume of said pulses of substantially fuel-free fluid introduced into said fuel stream responsive to said measured parameter.

13. The method of claim 9 wherein said substantially fuel-free fluid introduced into said fuel stream is cooler than the internal operating temperature of said fuel cell.

14. The method of claim 9 wherein said substantially fuel-free fluid comprises water.

15. The method of claim 9 wherein said substantially fuel-free fluid comprises oxygen.

16. The method of claim 9 wherein said substantially fuel-free fluid is unreactive at said fuel cell anode.

17. The method of claim 9 wherein said fuel stream is a gas stream and said substantially fuel-free fluid is a liquid.

18. The method of claim 17 wherein said substantially fuel-free fluid is a coolant.

19. The method of claim 9 wherein said fuel stream is a gas stream and said substantially fuel-free fluid is a gas.

20. The method of claim 19 wherein said substantially fuel-free gas is selected from the group consisting of nitrogen, argon, helium, and hydrocarbons.

21. The method of claim 19 wherein said substantially fuel-free gas comprises exhaust gas from said fuel cell cathode.

22. The method of claim 9 wherein said fuel stream is a liquid stream and said substantially fuel-free fluid is a gas.

23. The method of claim 9 wherein said fuel stream is a liquid stream and said substantially fuel-free fluid is a liquid.

24. The method of claim 23 wherein said liquid fuel stream comprises aqueous methanol and said substantially fuel-free fluid is water.

25. The method of claim 23 wherein said substantially fuel-free fluid is immiscible with said liquid fuel stream.

26. The method of claim 9 further comprising the steps of periodically:

closing a fuel supply valve to stop the flow of said fuel stream upstream of said solid polymer electrolyte fuel cell; and opening an interrupt valve to introduce a pulse of a substantially fuel-free fluid stream into said fuel stream.

27. The method of claim 9 wherein said fuel supply stream is maintained at a lower pressure than said substantially fuel-free fluid stream, and said method further comprises periodically opening an interrupt valve to introduce a pulse of a substantially fuel-free fluid stream into said fuel stream.

28. The method of claim 1 wherein said method comprises periodically connecting a transient electrical load to draw electrical power from said solid polymer electrolyte fuel cell.

29. The method of claim 28 wherein the rate of supply of said fuel stream to said solid polymer electrolyte fuel cell anode is not increased in response to the connection of said transient load.

30. The method of claim 28 wherein said transient electrical load comprises a capacitor.

31. The method of claim 28 wherein said transient electrical load is connected to draw electrical power from said solid polymer electrolyte fuel cell at regular time intervals.

32. The method of claim 28 further comprising:

monitoring an operational parameter of said solid polymer electrolyte fuel cell; and adjusting the frequency with which said transient electrical load is connected to draw electrical power from said solid polymer electrolyte fuel cell responsive to said monitored parameter.

33. The method of claim 28 further comprising:

monitoring an operational parameter of said solid polymer electrolyte fuel cell; and adjusting the duration for which said transient electrical load is periodically connected to draw electrical power from said fuel cell responsive to said monitored parameter.

34. The method of claim 28 wherein said solid polymer electrolyte fuel cell is one of a plurality of solid polymer electrolyte fuel cells arranged in a stack, and the periodic connection of said transient load to draw power from each one of said plurality of solid polymer electrolyte fuel cells is not simultaneous.

35. The method of claim 1 wherein said fuel stream comprises hydrogen, carbon monoxide and carbon dioxide.

36. The method of claim 1 wherein said solid polymer electrolyte fuel cell is a direct methanol fuel cell and said fuel stream comprises aqueous methanol.

37. The method of claim 1 wherein at least one of the duration and frequency of said periodic fuel starvation is selected as a function of the concentration of catalyst poisoning species in said fuel stream.

38. The method of claim 2 wherein said fuel stream is periodically interrupted for a duration of one second.

39. A method of operating a fuel cell assembly comprising a plurality of fuel cells, each of said fuel cells comprising an anode and a cathode, said method comprising:

supplying an oxidant stream to said cathodes;

supplying a fuel stream to said anodes; and periodically fuel starving at least one of said anodes such that a cell reversal occurs in said at least one of said fuel cells while continuing to generate electrical power from said fuel cell assembly.

* * * * *